FIG. 2
FIG. 3
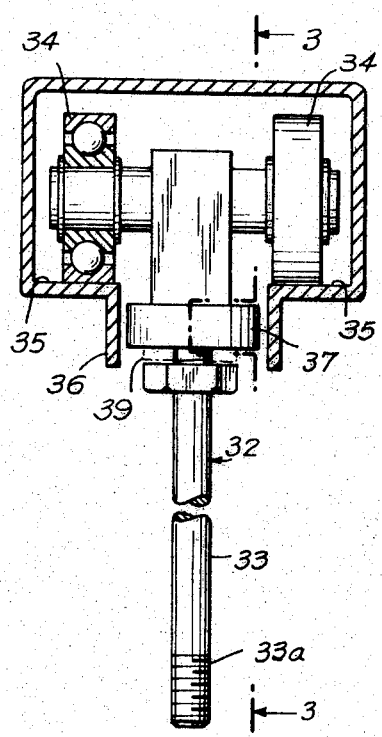
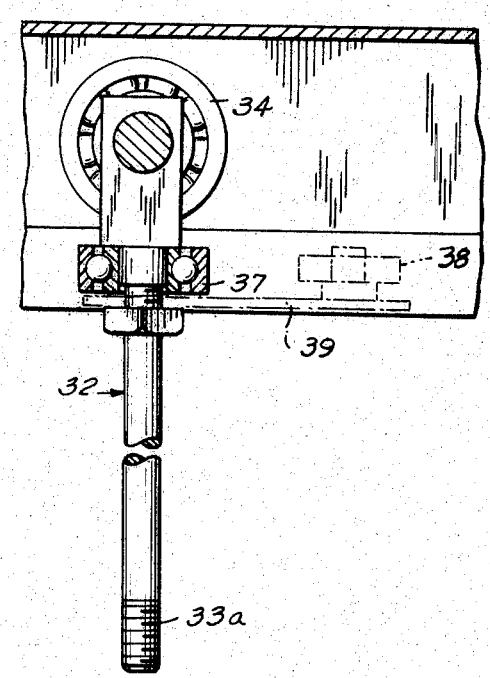

Jan. 2, 1968 G. T. ELIASSEN 3,361,079
CONVEYOR SYSTEM
Filed Feb. 28, 1964 11 Sheets-Sheet 3

INVENTOR.
Gunnar Thue Eliassen
BY
ATTORNEY

Jan. 2, 1968 G. T. ELIASSEN 3,361,079
CONVEYOR SYSTEM
Filed Feb. 28, 1964 11 Sheets-Sheet 7

United States Patent Office 3,361,079
Patented Jan. 2, 1968

3,361,079
CONVEYOR SYSTEM
Gunnar Thure Eliassen, Partille, Sweden, assignor to Aktiebolaget Electrolux, Stockholm, Sweden, a corporation of Sweden
Filed Feb. 28, 1964, Ser. No. 348,213
Claims priority, application Sweden, Feb. 28, 1963, 2,226/63
14 Claims. (Cl. 104—88)

My invention relates to a conveyor system for transporting articles.

An object of my invention is to provide an improved transfer or switching unit for transferring articles from an article receiving path or line to a number of storage paths and for transferring the articles from the storage paths to an article delivery line.

Another object of my invention is to provide an improved conveyor system having an article receiving path or line and an article delivery path or line and a plurality of storage paths therebetween, and improved mechanism for selectively transferring articles automatically from the article receiving path to the storage paths and for selectively transferring articles automatically from tne storage paths to the article delivery path or line.

A further object of my invention is to provide an improved conveyor system having article receiving and article delivery paths, respectively, and a plurality of storage paths therebetween which are arranged at different levels and to and from which the articles are raised and lowered, respectively, by elevators or lifts.

A still further object of my invention is to provide the storage paths at different levels in adjacent vertical banks with the vertically spaced storage paths in each bank one above another.

A still further object of my invention is to provide article receiving paths and article delivery paths in vertical banks one above another at opposite ends of the storage paths, and raising articles from a feed path to the article receiving paths at the different levels by a single elevator or lift and lowering articles from the article delivery paths at the different levels by a single elevator or lift to a discharge path.

A still further object of my invention is to provide a conveyor system provided with a dispatching unit operated by material which is fed thereto and includes dispatching information which functions to selectively transfer articles automatically from an article receiving line to a plurality of storage paths.

A still further object of my invention is to provide a conveyor system provided with a dispatching unit operated by material which is fed thereto and includes dispatching information which functions to selectively transfer articles from a plurality of storage paths to an article delivery path.

A still further object of my invention is to provide a conveyor system for articles provided with a dispatching unit operated by punched cards for selectively transferring articles automatically from an article receiving line to a plurality of storage paths and for selectively transferring articles automatically from the storage paths to an article delivery path.

Further objects and advantages of my invention will become apparent as the following description proceeds, and the various features of novelty which characterize the invention are pointed out with particularly in the claims annexed to and forming a part of this specification.

For a better understanding of the invention, reference may be had to the following description taken in connection with the accompanying drawing, in which:

FIG. 2 is a transverse sectional view of a track illustrating one practical form the conveyor and storage lines or paths of FIG. 1 may take and a wheeled carrier unit movable thereon;

FIG. 3 is a vertical view, partly in section, taken at line 3—3 of FIG. 2;

In FIGS. 1 to 7 I have diagrammatically illustrated apparatus embodying my invention which includes an article receiving line or path 10 to one end of which articles are supplied in a manner described hereinafter and from which articles are selectively distributed to a plurality of storage paths or lines 11, 12 and 13, and from which storage paths the articles are selectively removed to an article delivery line 14. Any number of storage paths or lines may be provided, and in the embodiment illustrated three such paths are shown.

When a variety of articles are being moved on the article receiving line 10, for example, switch or transfer units 16 may be employed to transfer from the receiving line to each of the storage lines articles which are of the same kind or generally similar to one another. Each article is automatically transferred from the article receiving line or path 10 to a selected storage path by information received at a dispatching unit 17 which functions to cause a particular switch unit 16 to become operable to transfer a selected article automatically from the article receiving line 10 to a particular storage path.

Figure 1:
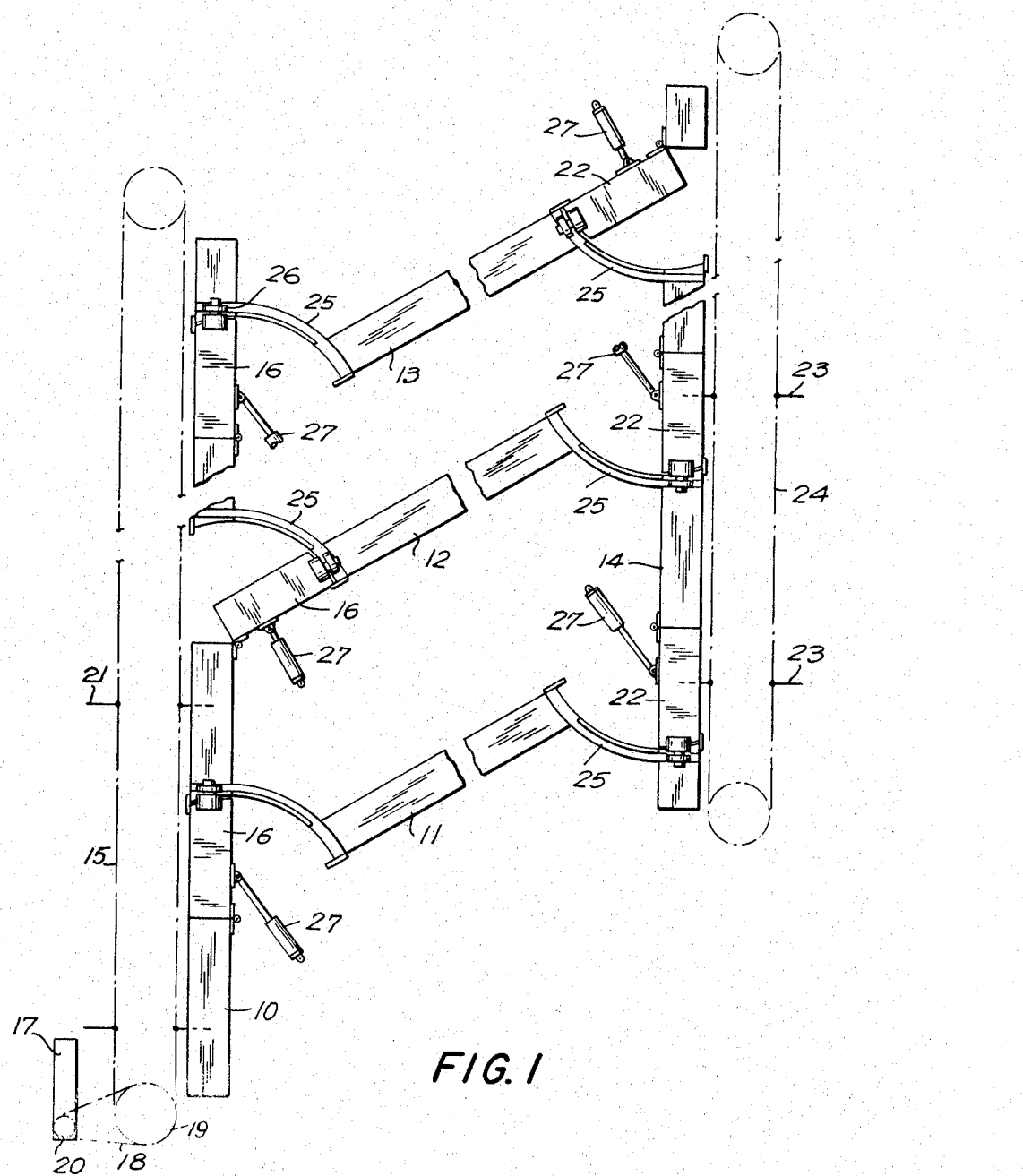
FIG. 1 is a top plan diagrammatically illustrating an embodiment of my invention for sorting and storing articles.
Figure 6:
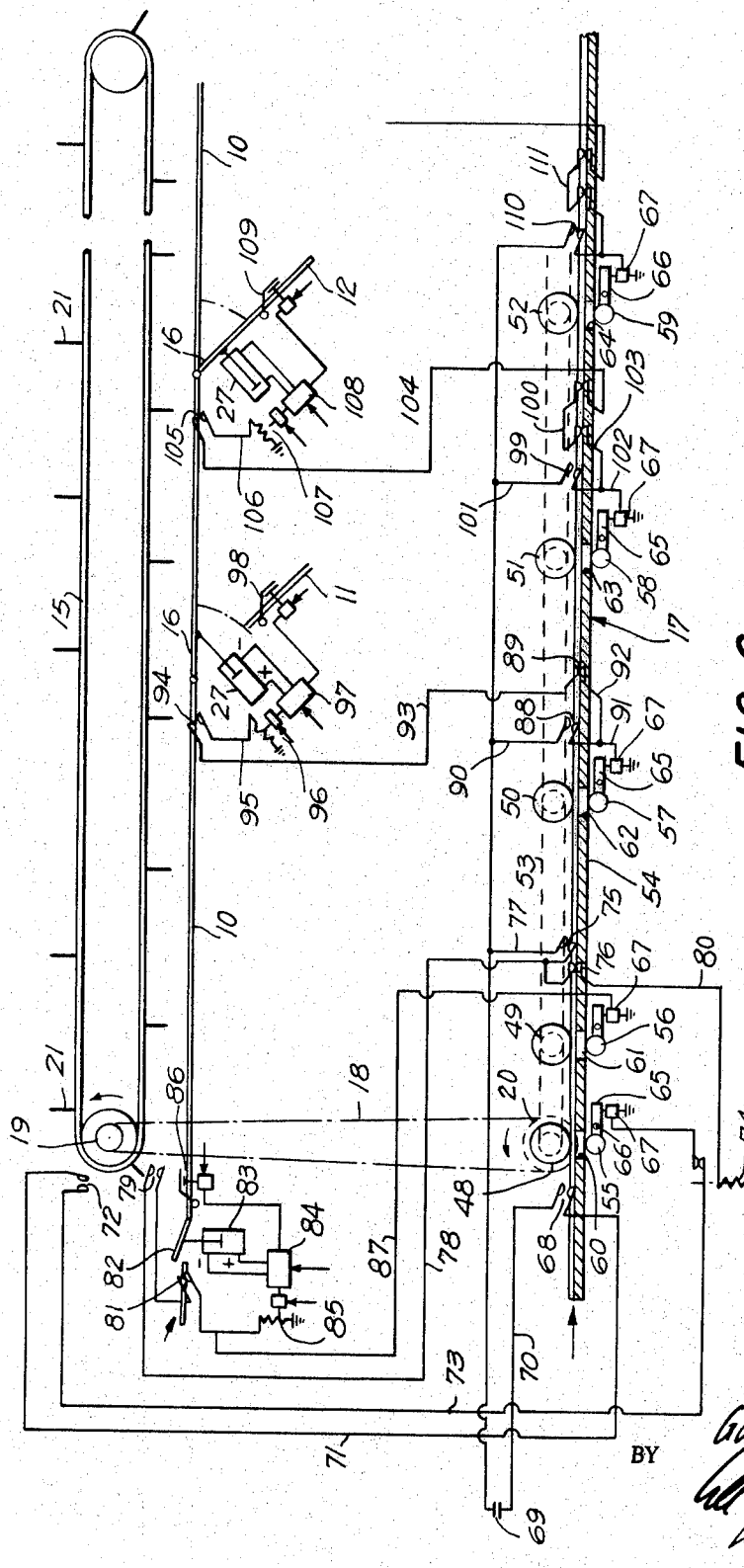
FIG. 6 is a diagrammatic representation of a control and electrical circuit therefor for controlling the movement of articles on the receiving line and the selective transfer or switching of the articles therefrom to the storage paths or lines.

An endless belt 15, which is arranged adjacent to the article receiving line 10 and driven in any suitable manner, as by an electric motor, for example, passes over spaced rollers, one of which is indicated at 19 in FIGS. 1 and 6. Members 21 are distributed along the belt 15 and extend outward therefrom. The members 21, which are equally spaced from one another on the belt 15, function to propel and horizontally move the articles on the article receiving line or path, as will be described presently. The dispatching unit 17 includes mechanism which is driven in synchronism with the article propelling belt 15 and actuated through speed reduction mechanism comprising an endless belt 18 passing over the roller 19 and a roller 20 forming a component of the dispatching unit.

Figure 7:
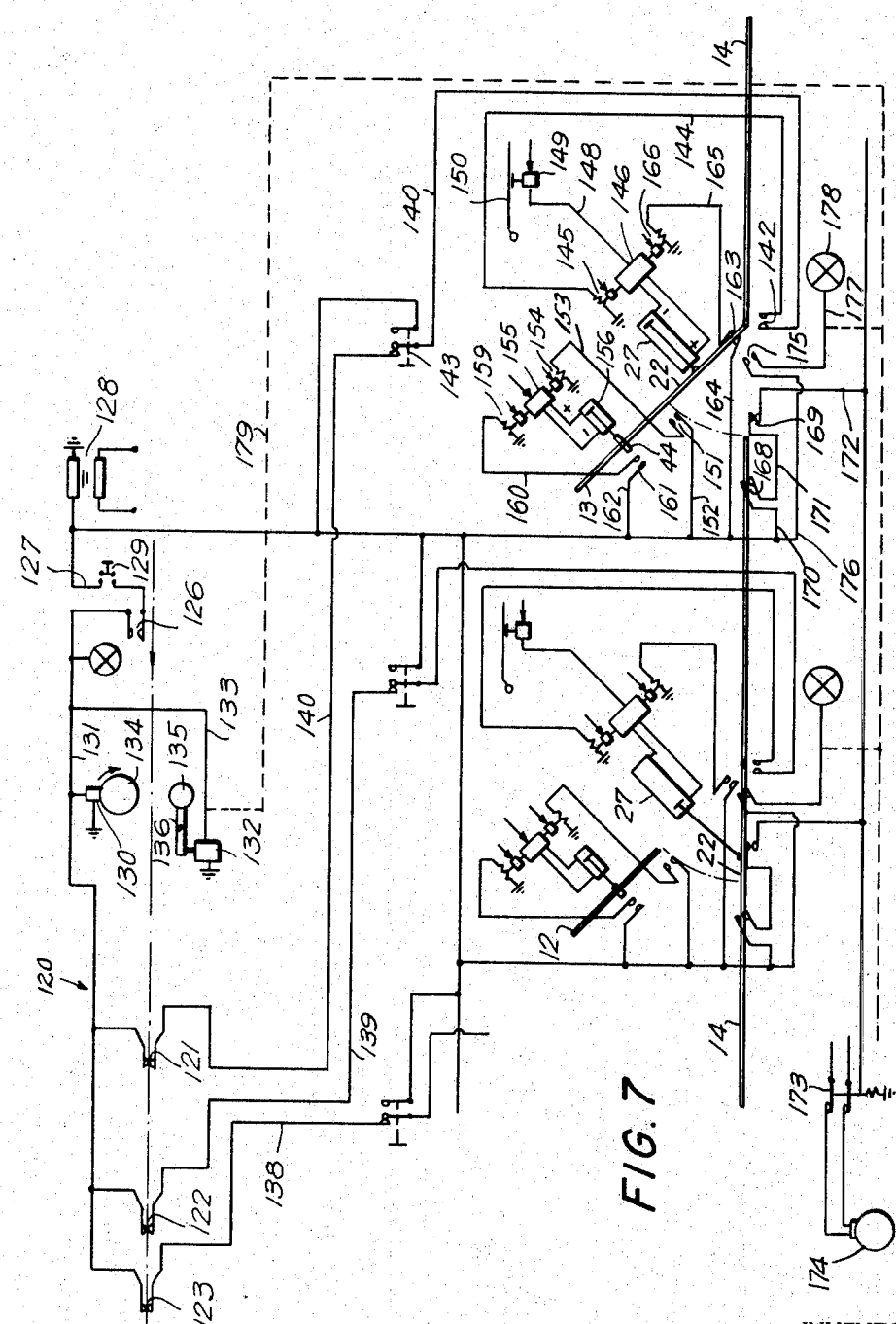
FIG. 7 is a diagrammatic representation of a control and electrical circuit therefor for controlling the selective switching or transfer of articles from the storage paths or lines to the article delivery line and the movement of the transferred articles on the delivery line.

The articles can be selectively transferred by switch or transfer units 22 from the storage paths 11, 12 and 13 to the article delivery line or path 14. An endless belt 24, which is adjacent to the article delivery line 14 and like the belt 15 and driven by a motor 174, as shown in FIG. 7, is provided with spaced members 23 which extend outward therefrom and are equally spaced from one another and function to propel and horizontally move the articles transferred to the article delivery line 14.

Figure 4:
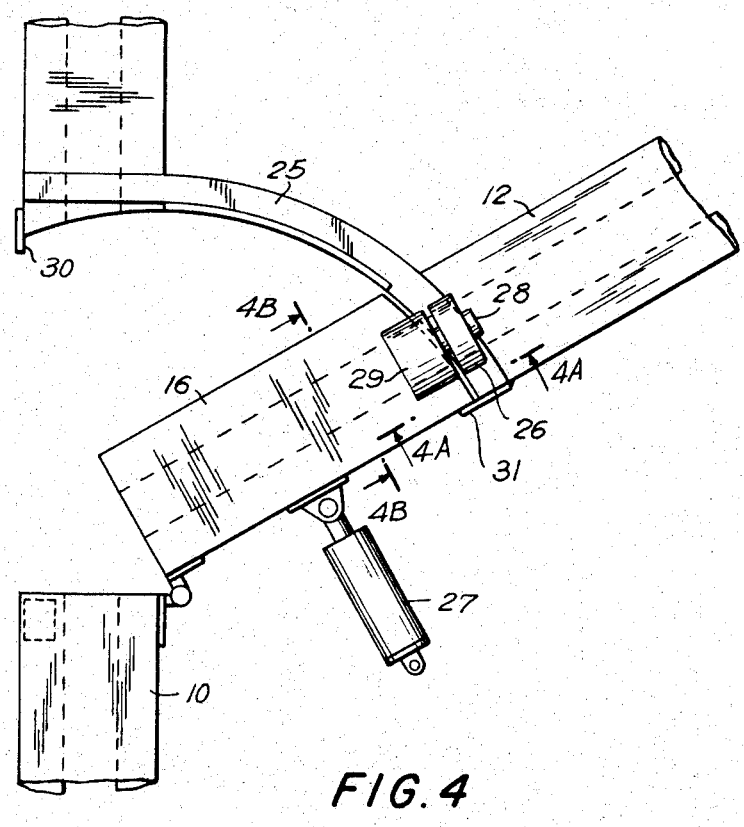
FIG. 4 is an enlarged top plan view of a transfer or switch unit shown in FIG. 1 for transferring a carrier unit and article carried thereby from a receiving line to a storage line.

The switch or transfer units 16 and 22 are horizontally disposed and pivotally mounted on the article receiving and delivery lines 10 and 14, respectively, and their outer ends engage and move over horizontally disposed rails 25 of arcuate form in top plan view, as shown in FIGS. 1 and 4. One end of each rail 25 is at the vicinity of the article receiving line 10 or article delivery line 14 and the other end thereof is at the vicinity of a different one of the storage paths 11, 12 and 13. I accomplish this by providing at the outer end of each switch unit 16 and 22 a roller 26 which is rotatably mounted thereon and rolls over one of the horizontally disposed rails 25 when movement is imparted to the switch unit by a pneumatically operated cylinder 27. With this ararngement, the switch or transfer units 16 and 22 can be moved from first positions in which they form a section of the article receiving or article delivery lines 10 and 14, respectively, to second positions in which they form sections of the storage paths 11, 12 and 13.

Figure 4A:
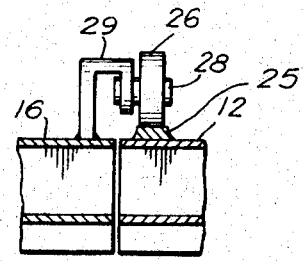
FIGS. 4A and 4B are sectional views taken at lines 4A—4A and 4B—4B, respectively, of FIG. 4.
Figure 4B:
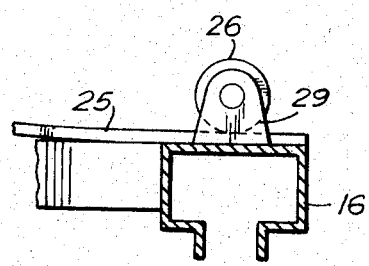

As shown in FIGS. 4 and 4A, the roller 26 is rotatably mounted on a pin 28 fixed to a bracket 29 provided at the outer end of the switch unit 16 which transfers articles from the article receiving line 10 to the storage path 12. As seen in FIG. 4B, the rail 25 slopes horizontally downward from the article receiving line 10 to the storage line 12 which in turn slopes downward to the article delivery line 14. With this arrangement, articles transferred from the article receiving line 10 to the storage lines move horizontally downward by gravity to the lower ends of the storage lines. As seen in FIG. 4, stops 30 and 31 are provided in the article receiving line 10 and storage paths, respectively, to limit horizontal swinging movement of the switch or transfer units and make certain that they are in proper alignment with article receiving line and storage line, respectively, when moved thereto.

In the embodiment being described, the articles are suspended from and carried by carrier units 32 having downwardly depending rods 33 provided with lower threaded ends 33a to which may be removably connected suitable members (not shown) for carrying the articles to be sorted and stored in the different storage paths. As shown in FIGS. 2 and 3, the vertical rods 33 form part of T-shaped members having top horizontal arms at the opposite ends of which are rotatably mounted wheels or rollers 34, the outer rims of which form the outer races of ball bearings. The article receiving and delivery paths 10 and 14 and storage paths therebetween are formed of elongated members which in transverse section are rectangular and include bottom horizontal wall sections 35 which extend inward from vertical wall sections and at their inner extremities are spaced from one another and provided with downwardly extending flanges 36.

The spaced horizontal wall sections 35 serve as a horizontally extending track for the carrier units 32 over which the wheels 34 move. Rollers 37, the outer rims of which form the outer races of ball bearings, are provided on the vertical rods 33 between the vertical flanges 36 to guide the carrier units 32 during their horizontal movement on the horizontal wall sections 35. The vertical rod 33 of each carrier unit extends through an opening formed at one end of a holder 39 which extends lengthwise of the flanges 36 and in the gap therebetween. The holders 39 are held on the vertical rods 33 at the level of the flanges 36 and at their outer ends are provided with ball bearings 38, as indicated in dotted lines in FIG. 3, which are similar to the ball bearings 37. The ball bearings 38 function to guide the carrier units 32 between the flanges 36 and may be disposed ahead of or to the rear of the carrier units during their movement on the article receiving and delivery paths and on the storage paths.

Figure 5:
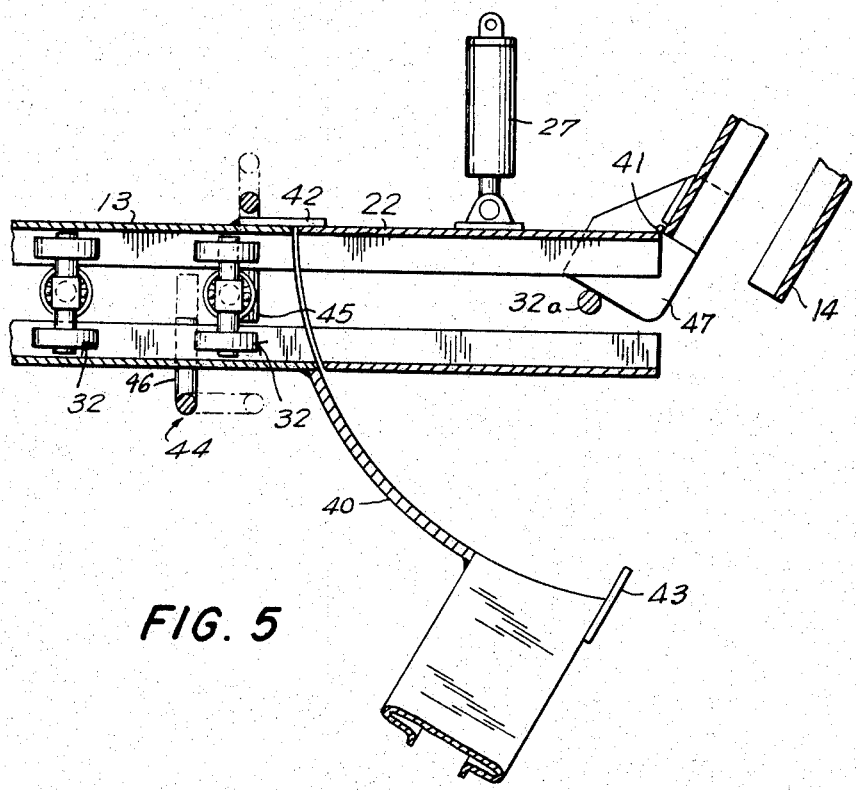
FIG. 5 is an enlarged top plan view, partly broken away and in section, of a transfer or switch unit shown in FIG. 1 for transferring a carrier unit and article carried thereby from a storage line to a delivery line.
Figure 5A:
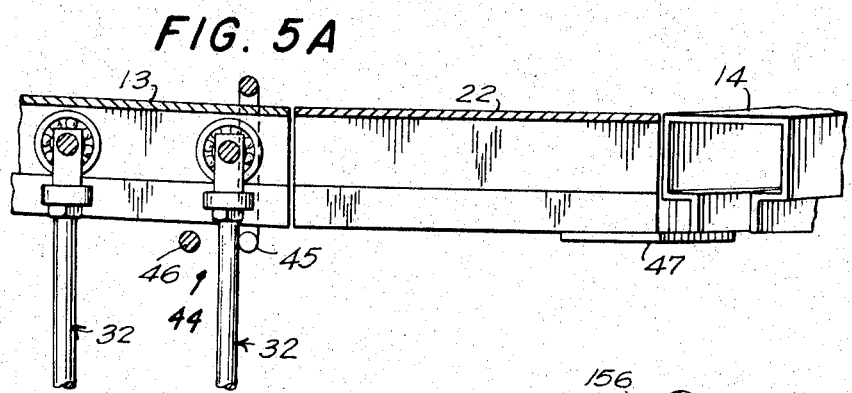
FIG. 5A is a vertical sectional view of the switch or transfer unit shown in FIG. 5.

The switch or transfer unit 22 for transferring articles from one of the storage paths 13 to the article delivery line 14 is shown in FIGS. 5 and 5A. The rail 25 for the switch unit is not seen in FIG. 5 in order to illustrate a vertical reinforcing rib 40 for the rail which is of arcuate form and at the underside thereof. The switch unit 22 is horizontally disposed and pivotally mounted on the article delivery line 14 at 41 and is horizontally movable between the storage path 13 to a position where it becomes a part of the article delivery line 14 by a pneumatically operated cylinder 27. Stops 42 and 43 are provided on the storage path 13 and on the article delivery line 14, respectively, to limit movement of the switch unit 22 between its extreme end positions at the storage path and article delivery line.

The lower ends of the horizontally extending storage paths 11, 12 and 13 are provided with devices which function to stop the carrier units 32 moving horizontally downward on the paths by gravity. Such a device 44 is shown in FIGS. 5 and 5A at the lower end of the storage path 13. The device 44 is located in front of the outer extremity of the pivotally mounted switch unit 22 and functions in such manner that only one carrier unit 32 can advance onto the switch unit when it is in alignment with the storage path and forward movement of the leading carrier unit 32 on the storage passage is blocked when the switch unit 22 forms a component of the article delivery line 14 and is in alignment therewith.

Figure 5B:
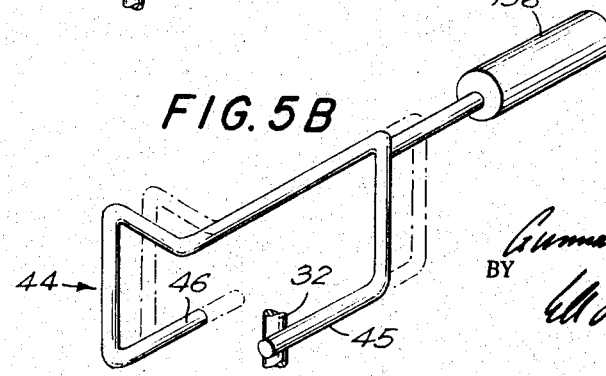
FIG. 5B is a fragmentary perspective view of details illustrated in FIGS. 5 and 5A and a component of the operating mechanism therefor.

As seen in FIGS. 5, 5A and 5B, the device 44 comprises rods 45 and 46 which are disposed at opposite sides of the storage path 13 and have horizontal arms movable into and out of the path of movement of the carrier units 32. In the solid line positions of the rods 45 and 46 in FIG. 5, the rod 45 is in the path of movement of the leading carrier unit 32 and blocks forward movement thereof. The rod 46 is out of the path of movement of the carrier units 32 which will permit the second carrier unit 32 to move forward on the storage path until it is stopped by the leading carrier unit 32.

When the switch unit 22 is in the position shown in FIG. 5 and it is desired to transfer the leading carrier unit 32 from the storage path to the article delivery carrier 14, the device 44 is actuated whereby the rod 45 is retracted to a position out of the path of movement of the leading carrier unit 32, as indicated by the dotted lines in FIGS. 5 and 5B, thereby permitting the leading carrier unit to advance by gravity onto the switch unit 22. At the same time the rod 45 is retracted out of the path of movement of the leading carrier unit 32, the rod 46 is moved to the dotted line position in FIGS. 5 and 5B between the leading carrier unit and the carrier unit behind it, thereby preventing forward movement of the second carrier unit on the storage path. The rod 46 can move to its dotted line position in FIGS. 5 and 5B because the first and second carrier units are separated by the holder 39 and ball bearing 38 carried by one of the carrier units and extending toward and engaging the other of the carrier units.

After the leading carrier unit 32 has advanced onto the switch 22, the device 44 can be actuated to return rod 45 to its solid line position in FIGS. 5 and 5B, after which the rod 46 can be retracted to its solid line position, whereby the second carrier unit 32 can move forward on the storage path 13 until it is stopped by the rod 45. Although I have not shown mechanism for actuating the rods 45 and 46 in and out of the path of movement of the carrier units 32 in the manner just described, it will be understood that the device 44 can be operated pneumatically by compressed air in a manner which will be described hereinafter, and that the rods 45 and 46 may form components of a single control operable to impart back and forth movement to the rods.

A stationary plate 47 is provided at the zone the switch unit 22 is pivotally mounted at 41 on the article delivery line 14. As shown in FIG. 5, the carrier unit 32 advancing onto the switch unit 22 strikes a forward edge of the plate 47 which is inclined at an acute angle to the direction of movement of the carrier unit. In FIG. 5 the forward part of the carrier unit is indicated schematically at 32a to illustrate more clearly the forward edge of the plate 47 contacted by the carrier unit. When the switch unit 22 is moved about its pivot at 41 to transfer the carrier unit thereon to the article delivery line 14, the carrier unit will slide over the forward edge of the blocking plate 47 and eventually will clear the blocking plate when the switch unit is in its position against the stop 43 and forms a component of the article delivery line. When this occurs, one of the members 23 on the belt 24 becomes operable to propel the transferred carrier unit 32 on the article delivery line 14, the upper end of the vertical rod 33 of the carrier unit being in the path of movement of the one member 23 whereby the latter propels and moves the carrier unit along the article delivery path.

FIG. 6 diagrammatically represents control provisions and an electrical circuit therefor for controlling the movement of articles on the article receiving line 10 and the selective transfer or switching of the articles therefrom to the storage paths or lines 11 and 12, the storage path 13 being omitted since it is not necessary for an understanding of the invention. In FIG. 6 it will be seen that the roller 20 of the dispatching unit 17 is driven by an endless belt 18 from the roller 19, as previously explained. The dispatching unit 17 is of a type to which punched cards can be fed to cause the switch units 16 to function in a selective manner to transfer articles from the article receiving line 10 to the storage paths. Each punched card fed to the dispatching unit 17 includes dispatching information which functions to cause the control mechanism to operate in a particular manner, whereby a particular switch unit 16 becomes operable to selectively transfer a designated article automatically from the article receiving line 10 to a particular storage path.

The dispatching unit 17 comprises a plurality of rollers 48, 49, 50, 51 and 52 which are horizontally spaced from one another, the roller 48 being driven by the roller 20 over which the endless belt 18 passes. An endless chain 53 driven by the roller 48 is employed to drive the rollers 49, 50, 51 and 52. With this arrangement all of the rollers 48, 49, 50, 51 and 52 are driven at the same peripheral speed and in synchronism with the belt 15.

The dispatching unit 17 includes a horizontal plate 54 which functions as a support for punched cards or other material which includes dispatching information, the gap between the plate 54 and the rollers 48, 49, 50, 51 and 52 being slightly greater than the thickness of the punched cards. At the underside of the plate 54 and in vertical alignment with the rollers 48, 49, 50, 51 and 52 are provided a second horizontal row of rollers 55, 56, 57, 58 and 59, which may be referred to as pressure rollers. The plate 54 is formed with a series of holes or openings 60, 61, 62, 63 and 64, each of which is in alignment with a pair of rollers directly opposite one another and above and below the plate, respectively. Each pressure roller is movable into the opening or hole adjacent thereto and engages or contacts the underside of a punched card and moves the card against the rollers 48, 49, 50, 51 and 52.

Each pressure roller 55, 56, 57, 58 and 59 is mounted for rotation at one end of a lever 65 which is pivoted intermediate its ends at 66. Hence, each lever 65 rocks about the pivot 66 and the pressure roller thereon is freely rotatable adjacent to one of the openings in the plate 54. The opposite end of each lever 65 is connected to an actuating member 67, such as an electrical solenoid, for example.

A contact breaker 68 in front of the first roller 48 is acted upon by a punched card when it is slid on the top surface of the plate 54 toward the gap between the plate and the first roller 48, in the direction of the arrow at the left end of the plate 54. When this occurs the punched card is moved between the first pair of rollers 48 and 55 and the second pair of rollers 49 and 56. The punched card closes the contact breaker 68. When one of the article propelling members 21 on the belt 15 becomes operable to close a contact breaker 72, a circuit will be completed from a source of electrical supply 69 through conductor 70, contact breaker 68, conductor 71, contact breaker 72, conductor 73, relay 74 and solenoid 67. When the solenoid 67 is energized it attracts one end of the lever 65 whereby the roller 55 at its opposite end is moved upward into the opening 60 against the roller 48 and the latter is rendered operable to move the punched card toward the right in FIG. 6.

Two contact breakers 75 and 76 are provided at the right side of the roller 49. The contact breaker 75 is connected by a conductor 77 with the source of electrical supply 69, such as a transformer, for example, and by a conductor 78 to a contact breaker 79 which is actuated by the members 21 on the belt 15. The contact breaker 76 is connected to the contact breaker 75 and by a conductor 80 to the relay 74. When a punched card advances on the plate 54 so that a marking hole therein moves into position in front of the contact breaker 76, this contact breaker will complete a circuit through the conductor 80 to the relay 74 and open the circuit for the solenoid 67. When this occurs the lever 65 rocks about its pivot and the pressure roller 55 moves downward, whereby the punched card stops moving. The contact breaker 72 is actuated by a member 21 and is closed until the solenoid 67 becomes de-energized and the punched card stops moving.

While the punched card is stationary and the marking hole therein is opposite the contact breaker 76, the member 21 on the belt 15 continues to move toward a contact breaker 79. The contact breaker 79 is connected to a contact breaker 81 actuated by the carrier units 32 at the end of the article receiving line 10 at which the articles are adapted to be supplied thereto in any suitable manner (not shown). The contact breaker 81 is in front of a stop 82 which functions to advance one carrier unit 32 at a time on the article receiving line 10. The stop 82 is operated by a pneumatic cylinder 83 under the control of a master air control valve 84. A solenoid-operated valve 85 is connected to the contact breaker 81 which in turn is connected by conductor 87 to the solenoid 67 associated with the pressure roller 56.

When an article propelling member 21 on the belt 15 closes the contact breaker 79 and at the same time the contact breaker 81 is closed by the action of a carrier unit 32, an electrical circuit will be completed for the solenoid-operated valve 85 and also for the solenoid 67 operatively associated with the pressure roller 56. When solenoid-operated valve 85 is energized, a pilot air control system of which the valve 85 is a part becomes operable to cause the master air control valve 84 to function to render the pneumatic cylinder 83 operable to move the stop 82 to permit a carrier unit 32 to advance on the article receiving line 10. The carrier unit 32 advanced on receiving line 10 then becomes operable to act on a pilot valve 86. The pilot valve 86 is a part of a pilot air control system which now becomes operable to cause the master air control valve 84 to function to render the pneumatic cylinder 83 operable to raise the stop 82. The member 21 on the belt 15 now becomes operable to propel a carrier unit 32 on the article receiving line 10.

As just explained, an electrical circuit will be completed through conductor 87 for the solenoid 67 when the stop 82 is actuated. When this occurs the pressure roller 56 moves upward against the roller 49 to render the latter operable to feed the punched card to the right. Under these conditions, movement of the movable member 21, which propels and moves a carrier unit 32, and movement of the punched card are synchronized.

Two contact breakers 88 and 89 are located at the right side of the drive roller 50, the contact breaker 88 being connected by the conductor 90 to the source of electrical supply 69 and by the conductor 91 to the solenoid 67 associated with the pressure roller 57. The contact breaker 88 is actuated by the front edge of the punched card and completes a circuit for the solenoid 67, whereby the lever 65 rocks about its pivot and moves the pressure roller 59 through the opening 62 in the plate 54 to force the punched card against the roller 50 and render the latter operable to drive the punched card. The contact breaker 75 opens when it is no longer acted upon by the punched card.

The contact breaker 89 is connected by the conductor 92 to the conductor 91 of the contact breaker 88 and by a conductor 93 to a contact breaker 94 at the vicinity of the article receiving line 10. The contact breaker 94, which is actuated by carrier units 32 moving on the article receiving line 10, is located immediately in front of the switch or transfer unit 16 associated with the storage path 11.

The switch unit 16 is operated by the pneumatic cylinder 27 under the control of a master air control valve 97. A solenoid-operated valve 96 is connected by conductor 95 to the contact breaker 94. When one of the carrier units 32, with one or more articles thereon, is propelled and moved on the receiving line 10 by the propelling members 21 of the belt 15 and actuates the contact breaker 94, the punched card has moved such a distance on the plate 54 that a hole or opening therein, which designates the storage path to which a carrier unit 32 is to be directed from the receiving line 10, reaches a point in the travel of the punched card which enables contact breaker 89 to be actuated. This completes a circuit for the solenoid-operated valve 96 from the contact breaker 88 through conductor 92, contact breaker 89, conductor 93, contact breaker 94 and conductor 95 to solenoid-operated valve 96. When solenoid-operated valve 96 is energized, a pilot air control system of which the valve 96 is a part becomes operable to cause the master air control valve 97 to function to render the pneumatic cylinder 27 operable to actuate the switching unit 16 to move it from a position in alignment with the receiving line 10 to a position in alignment with the storage path. The carrier unit 32 diverted from the line 10 by the switch unit 16 to the storage path 11 moves downward by gravity and on the storage path the diverted carrier unit 32 actuates a pilot valve 98. The pilot valve 98 is a part of a pilot air control system which now becomes operable to cause the master air control valve 97 to function to render the pneumatic cylinder 27 operable to move the switch unit 16 from the storage path 11 to the article receiving line 10 in alignment therewith.

The punched card in the dispatching unit 17 now has advanced on the plate 54 to the next drive roller 51 and pressure roller 58. Contact breakers 99 and 100 are located at the right side of the roller 51. These contact breakers correspond to contact breakers 88 and 89 at the right side of the drive roller 50. The contact breaker 99 is connected by a conductor 101 to the source of electrical supply 69 and by the conductor 102 to the solenoid 67 associated with the pressure roller 58. The contact breaker 100 is connected by a conductor 103 to the contact breaker 99 and by a conductor 104 to a contact breaker 105 at the vicinity of the article receiving line 10. The contact breaker 105 is connected by a conductor 106 to a solenoid-operated valve 106 which is associated with a pilot air control system and, when energized, causes a master air control valve 108 to function to render the pneumatic cylinder 27 operable to actuate the switching unit 16 at the storage path 12 to divert a carrier unit 32 to this storage path when the carrier unit actuates the contact breaker 105. After the carrier unit 32 has been diverted to the storage path 12, it actuates a pilot valve 109 which is associated with a pilot air control system and now becomes operable to cause the master air control valve 108 to function to render the pneumatic cylinder 27 operable to move the switch unit 16 from the storage path 12 to the article receiving line 10 in alignment therewith.

The contact breaker 99 is actuated by the front edge of the punched card and completes a circuit for the solenoid 67, whereby the pressure roller 58 at the end of lever 65 moves through the opening 63 to force the punched card against the drive roller 51 and render the latter operable to drive the punched card. Let us assume that a carrier unit 32 on the line 10 has actuated the contact breaker 105. If no marking hole in the punched card is located at the contact breaker 100 to enable it to be actuated at the same time that contact breaker 105 is actuated, the air cylinder 27 is not rendered operable to move the switching unit 16 to shift or transfer the carrier unit 32 from the line 10 to the storage path 12 and the carrier unit 32 will continue to move on the article receiving line 10. If a marking hole in the punched card is located at the contact breaker 100 at the same time that contact breaker 105 is actuated, thus permitting contact breaker 100 to be actuated, the pneumatic cylinder 27 will be rendered operable to move the switch unit 16 from the line 10 to the storage path 11 in the same manner that a carrier unit 32 is diverted to storage path 11, as explained above.

Two contact breakers 110 and 111 are located at the right side of the drive roller 52. A pressure roller 59 cooperates with the drive roller 52 through an opening 64 in the plate 54. The contact breaker 111 is operatively associated with parts (not shown), which are like the parts 94 to 98 and 105 to 109 described above, for operating a switch unit 16 associated with the storage path 13 for diverting thereto carrier units 32 moving on the receiving line 10. The number of cooperating drive rollers and pressure rollers and control provisions associated therewith which are necessary will, of course, depend upon the number of storage paths embodied in the conveyor system.

FIG. 7 diagrammatically represents control provisions and an electrical circuit therefor for controlling the selective transfer or switching of articles from the storage paths 12 and 13 to the article delivery line 14, the storage path 11 being omitted since it is not necessary for an understanding of the invention. A dispatching unit 120 operated by punched cards is employed to selectively operate the switches 22 for transferring carrier units 32 from the storage paths to the delivery line 14. The dispatching unit 120 comprises a plurality of contact breakers 121, 122 and 123 past which punched cards are fed from right to left, as indicated by the arrow in FIG. 7.

The dispatching unit 120 also includes a contact breaker 126 which is actuated when a punched card is fed to the unit. The contact breaker 126 is connected by a conductor 127 to a source of electrical supply 128, a manually operable switch 129 being provided on the conductor 127. The contact breaker 126 is connected by a conductor 131 to a motor 130 and arranged to drive a roller 134, and by a conductor 133 to a solenoid 132 operatively connected to one end of a lever 136 which is pivoted intermediate its ends and to the other end of which a pressure roller 135 is mounted for rotation thereon.

The contact breaker 126 completes a circuit for the motor 130 and solenoid 132 and connects one side of the contact breakers 121, 122 and 123 to the source of electrical supply 128 responsive to feeding of a punch card to the dispatching unit 120. The pressure roller 135 forces the punched card against the driving roller 134 and renders the latter operable to move the punched card to the left. The punched cards are provided with holes which may be referred to as dispatching information to cause the switch units 22 to function in a selective manner to transfer articles from the storage paths to the delivery line 14. The contact breakers 121, 122 and 123 are connected by conductors 138, 139 and 140 to controls which are associated with the swtich units 22 for the storage paths 11, 12 and 13, respectively, and will now be described.

Let us assume that the punched card fed to the dispatching unit 120 is provided with a hole which enables the contact breaker 121 to complete a circuit to initiate operation of the switch unit 22 for the sotrage path 13, such circuit including the conductor 140. While the switch unit 22 for the storage path 13 is diagrammatically shown in alignment with the storage path and moved from the article delivery line 14 in FIG. 7, let us assume for the moment that this switch unit forms a component of the article delivery line 14 and is in alignment therewith. In such case, the switch unit 22 actuates contact breaker 142 which is connected by the conductor 140 to the contact breaker 121 of the dispatching unit 120. A manual contact 143 is provided in the conductor 140 which permits an operator to by-pass the dispatching unit 120 and connect conductor 140 directly to the source of electrical supply 128 to operate the switch unit 22 in the event this becomes necessary.

The contact breaker 142 is connected by a conductor 144 to a solenoid-operated valve 145 to complete a circuit which is closed when contact breaker 142 is actuated by the switch unit 22 when it forms a part of the delivery line 14. The solenoid-operated valve 145 is associated with a pilot air control system and, when energized, causes a master air control valve 146 to function in a manner which will be described presently. The master air control valve 146 is connected by a conduit 148 to a master air power source through which the flow of high pressure air is controlled by a valve 149 which is actuated at the proper time by a member 23 on the belt 24. Let us assume that one of the members 23, which may be propelling and moving a carrier unit 32 on the article delivery line 14, is moving onto the switch unit 22 forming a component of the delivery line. Under these conditions it is not desirable to shift the switch unit 22 from the delivery line 14 to the storage path 13 even when the contact breaker 121 of the dispatching unit 120 is rendered operable to connect conductor 140 to the source of electrical supply 128. Accordingly, the control valve 149 remains closed and renders master control valve 146 ineffective when a propelling member 23 is approaching and moving onto a switch unit. However, when the member 23 passes a switch unit 22 it acts upon a lever 150 which may be the same length as a switch unit 22. When this occurs control valve 149 opens and high pressure air can flow to the master air control valve 146, and, assuming that solenoid-operated valve 145 is energized, the master control valve 146 will function to render the pneumatic cylinder 27 operable to shift the switch unit 22 from the article delivery line 14 to a position in alignment with the storage path 13, as diagrammatically shown in FIG. 7.

When the switch unit 22 is moved to a position in alignment with the storage path 13, a contact breaker 151 is actuated which completes an electrical circuit to initiate operation of control mechanism to operate the stop device 44 shown in FIGS. 5, 5A and 5B and described above. The contact breaker 151 is connected by a conductor 152 to the source of electrical supply 128, and by a conductor 153 to a solenoid-operated valve 154 which is associated with a pilot air control system and, when energized, causes a master control valve 155 to function to render the pneumatic cylinder 156 operable to actuate the stop device 44. When this occurs the rod 45 will be retracted from its position in the path of movement of the leading carrier unit 32 on the storage path 13, as indicated by the dotted lines in FIGS. 5 and 5B, and permit the leading carrier unit 32 to move by gravity and advance onto the switch unit 22. At the same time that rod 45 is retracted the rod 46 of the stop device 44 is moved inward to its dotted line position in FIGS. 5 and 5B to hold back the carrier unit 32 behind the leading carrier unit 32.

In the retracted position of the rod 45 of the stop device 44, the latter actuates a contact breaker 161 which is connected by a conductor 162 to the source of electrical supply 128, and by a conductor 160 to a solenoid-operated valve 159. The solenoid-operated valve 159 is associated with a pilot air control system and, when energized, causes the master control valve 155 to function to render the pneumatic cylinder 156 operable to cause the rod 45 of the stop device 44 to become effective to stop movement of the leading carrier unit 32 on the storage path 13. After the rod 45 is moved into the path of movement of the leading carrier unit the rod 46 is retracted from its dotted line to its solid line position shown in FIGS. 5 and 5B.

When the leading carrier unit 32 advances on the switch unit 22 it actuates a contact breaker 163 connected by a conductor 164 to the source of electrical supply 128 and by the conductor 165 to a solenoid-operated valve 166. The solenoid-operated valve 166 is associated with a pilot air control system and, when energized, causes master air control valve 146 to function to render the pneumatic cylinder 27 operable to move the switch unit 22 from its position at the storage path 13 to its position at the article delivery line 14 where it forms a component thereof.

In order to prevent carrier units 32 moving on the article delivery line 14 from faliilng into an open space therein when a switch unit 22 has been moved from the delivery line to a position at which it cooperates with a storage path, I provide a first contact breaker 168 in front of a switch unit 22 and a second contact breaker 169 in the open space in the delivery line 14 which is formed when the switch unit 22 has been moved therefrom to cooperate with a storage path. The contact breaker 168 is connected by a conductor 170 to the source of electrical supply 128, and by a conductor 171 to the second contact breaker 169 which in turn is connected by a conductor 172 to a coil of a relay 173 which connects to a source of electrical energy a motor 174 for driving the belt 24 to which the propelling members 23 are fixed. When a carrier unit 32 actuates the contact breaker 168 and the switch unit 22 has been moved from the delivery line 14 to form an open space therein, a circuit will be completed through contact breaker 168 and contact breaker 169, which is normally closed when the switch unit 22 has been moved out of the delivery line 14, to energize relay 173 and cause the latter to open the circuit to the motor 174. When the switch unit 22 moves back to its closed position in the delivery line 14, the contact breaker 169 opens and renders relay 173 ineffective to disconnect the motor 174 from its source of electrical energy.

Another contact breaker 175 may be located in the open space in the delivery line 14 which is formed when the switch unit 22 has been moved to cooperate with the storage path 13. The contact breaker 175, which is closed when the open space in the delivery line 14 is formed and open when the switch unit 22 is moved to close the open space and form a component of the delivery line 14, is connected by a conduit 176 to the source of electrical supply 128 and by a conductor 177 to a signal lamp 178. Therefore, a circuit will be completed for the lamp 178 only when the switch unit 22 has been moved to a position in which it cooperates with the storage path 13. Alternatively, the contact breaker 175 may be connected by a conductor 179 to the conductor 135 of the circuit for the solenoid 132. With this arrangement the solenoid 132 will be rendered ineffective to move the pressure roller 135 against the drive roller 134 and the latter cannot function to move punched cards in the direction of the arrow when the switch unit 22 has been moved from the delivery line 14 and the contact breaker 175 closes to complete a circuit through conductor 179. When this occurs the solenoid 132 is short-circuited and the dispatching unit 120 is rendered inoperable.

Figure 8:
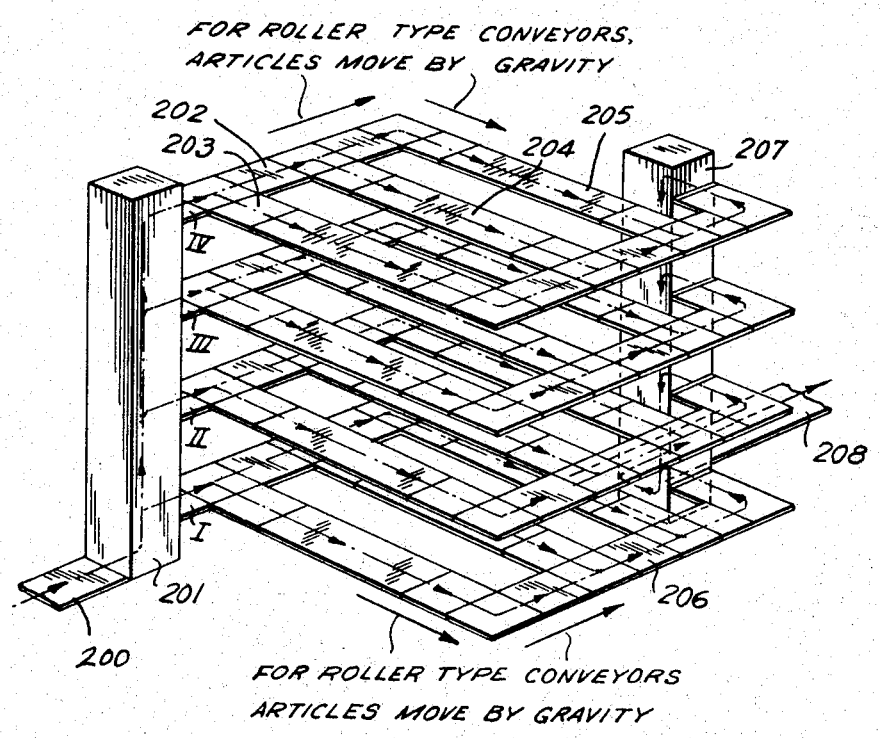
FIG. 8 is a diagrammatic perspective representation of a conveyor system having components at a plurality of different levels and elevators for raising and lowering articles to and from the different levels.

In FIG. 8 I have diagrammatically illustrated another form of the invention in which the articles received by a feed path 200 are intended to be supported at their bottoms and moved to an elevator or lift 201 in which the articles can be raised to any one of four different levels I, II, III and IV. At each level the articles pass from the elevator to an article receiving path or line 202 from which the articles can be transferred or diverted to any one of three storage paths 203, 204 and 205. In the arrangement illustrated in FIG. 8 it will be understood that any number of storage paths may be provided.

At each different level the articles are transferred from the storage paths 203, 204 and 205 to an article delivery path or line 206 for moving the articles to an elevator or lift 207. All of the articles are lowered in the elevator 207 to the same level and moved on a discharge path or line 208.

It will be apparent that other forms of storage systems like that shown in FIG. 8 and just described will occur to those familiar with the conveyor and storage art. By way of example and without limitation, the article receiving and delivery paths 202 and 206, respectively, may be omitted and each vertical bank of storage paths one above another may have a common elevator or lift at each end thereof. With this arrangement articles fed to an article receiving path or line may be selectively transferred to any one of several branch lines for movement to a particular elevator to be raised to any one of the four different levels. Conversely, all of the articles from one vertical bank of storage paths are lowered by a particular elevator to the same lower level, and at the lower level the articles from each elevator move over a branch path or line and are transferred therefrom to a single delivery path or line.

Figure 9:
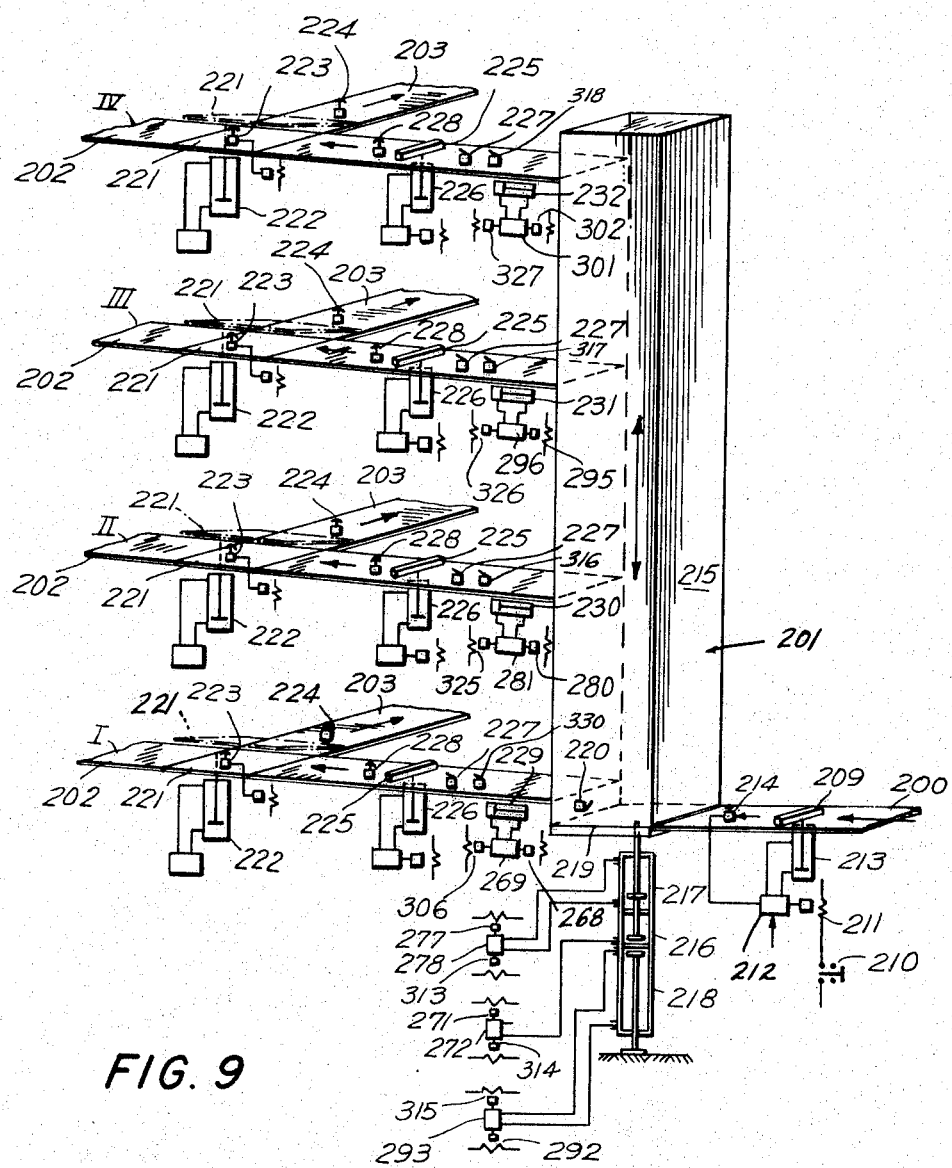
FIG. 9 is a diagrammatic representation of the control provisions for feeding articles and distributing the articles at the different levels of the conveyor system shown in FIG. 8.

In FIG. 9 I have shown a diagrammatic representation of the feed path 200, elevator 201, article receiving lines 202, and storage paths 203 seen in FIG. 8. The feed path 200 may be of the roller conveyor type which is inclined downward toward the elevator and over which articles move by gravity and come to rest against a stop 209 in front of the elevator 201. The stop 209 is vertically movable and can be lowered by mechanism which includes a solenoid-operated valve 211.

The electrical circuit for the solenoid-operated valve 211 may be completed by a manually operable switch 210. The solenoid-operated valve 211 is associated with a pilot air control system and, when energized, causes a master air control valve 212 to function to render a pneumatic cylinder 213 operable to lower the stop 209 downward between adjacent rollers of the conveyor out of the path of movement of the article. The article previously held against the stop 209 now can advance toward the elevator 201 and during such forward movement acts on a pilot valve 214. The pilot valve 214 is a part of a pilot air control system which now becomes operable to cause the master air control valve 212 to function to render the pneumatic cylinder 213 operable to raise the stop 209 against which the next article will come to rest.

The lift or elevator 201 comprises a platform 219 which can be displaced at different levels I, II, III and IV in an elevator shaft 215 by pneumatic cylinders 216, 217 and 218. A contact breaker 220 is actuated by the articles after introduction onto the platform 219. At each level I, II, III and IV, an article receiving line or distributing path 202 extends from the elevator 201. From the respective distribution paths, there extend storage paths, only one of which, designated 203, is shown at each level. To each storage path 203 the articles are transferred from the distribution path 202 by switch units 221 which in solid lines are shown in closed position and in dotted lines are shown in open position for transferring articles onto the storage paths. The switch units 221 may be opened and closed by pneumatic cylinders 222 in the same manner that the switch units 16 are opened and closed by the pneumatic cylinders 27 in the first-described embodiment of FIGS. 1 to 7. Further, a dispatching unit like the dispatching unit 17 of the embodiment of FIGS. 1 to 7 may be employed in FIG. 9 in which material provided with dispatching information, such as punched cards, is fed to the dispatching unit and moves in synchronism with articles moving on the article receiving line to selectively transfer and switch articles to particular storage paths.

Also, the switch units 221 may be like those disclosed in my application Ser. No. 228,522, filed Oct. 5, 1962, now Patent No. 3,173,557, granted Mar. 16, 1965, which employ valves similar to valves 223 and 224 which are adapted to be actuated by articles at the switch units 221 and at the storage paths 203, respectively, to control the opening and subsequent closing of the switch units. Further, a dispatching unit like that disclosed in my application Ser. No. 228,522, now Patent No. 3,173,557, may be employed with the switch units 221 to selectively transfer articles from the article receiving lines 202 to the storage paths 203. With a dispatching unit of this type it is desirable to employ a stop 225 in each path of movement of the articles which is actuated by a pneumatic cylinder 226, and to provide valves 227 and 228 in front of and beyond the stop 225 and also an electric switch arranged to synchronize the starting of the operation of the dispatching unit and the movement of the article on the article receiving line. Therefore, the disclosure in my application Ser. No. 228,522, now Patent No. 3,173,557, may be considered as being incorporated in this application, and, if desired, reference may be made thereto for a detailed description of the switch units and dispatching unit.

As explained above, the platform 219 is lifted to the different levels I, II, III and IV by the pneumatic cylinders 216, 217 and 218 to which air under pressure is supplied by three remote or master air control valves, as will be described hereinafter, the air being supplied only to the cylinder 216 for lifting to level I, to both the cylinders 216 and 217 for lifting to level II, to both cylinders 216 and 218 for lifting to level III, and to all three pneumatic cylinders for lifting to level IV. To transfer the articles from the platform 219 to the article receiving lines or distribution paths 202, the platform 219 preferably is inclined, and in order to prevent the undesired rolling of articles from the platform 219, a stop (not shown in detail) is provided at the lower end of the platform which can be actuated at each level I, II, III and IV by pneumatic cylinders 229, 230, 231 and 232, as will be described presently.

Figure 10:
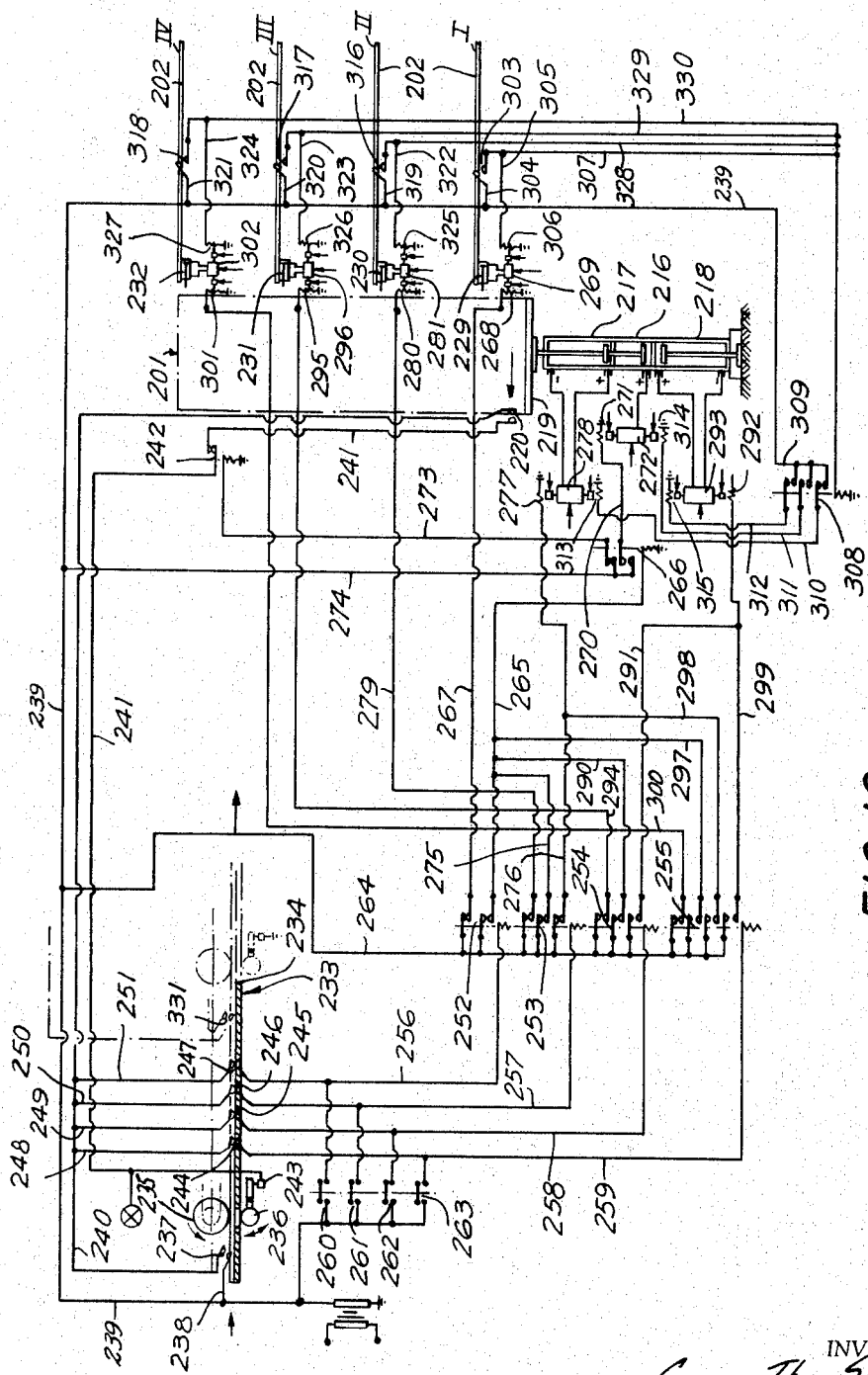
FIG. 10 is a diagrammatic representation of the electrical circuit embodied in the control provisions illustrated in FIG. 9.

FIG. 10 shows a schematic diagram for feeding the articles to the different levels I, II, III and IV by the elevator 201 shown in FIG. 9. The lifting of the articles by the platform 219 to the distribution paths 202 at the different levels I–IV is controlled by a dispatching unit of the same type previously described in connection with the embodiment of FIGS. 1 to 7. The dispatching unit 233 is shown schematically in the upper left-hand part of FIG. 10 and comprises a supporting plate 234 for material including dispatching information, such as a punched card, for example, the holes of which determine the destination of the articles. The dispatching unit 233 also comprises driving rollers 235 and pressure rollers 236 to hold the punched cards against the driving rollers. In front of the first driving roller 235 a contact breaker 237 is located which can be actuated by the punched card upon its insertion into the dispatching unit. The contact breaker 237 is connected by a conductor 238 to a source of electrical supply 239 and by a conductor 240 to contact breaker 220 which is actuated by feeding an article to the platform 219. The contact breaker 220 is connected by a conductor 241 and a relay 242 therein to a solenoid 243 for the first pressure roller 236. To the right of the driving roller 235 are located a number of contact breakers 244, 245, 246 and 247 which correspond to the levels I–IV. These contact breakers are connected by the conductors 248, 249, 250 and 251 to the conductor 240 which in turn is connected to the contact breaker 237, and by conductors 256, 257, 258 and 259 to relays 252, 253, 254 and 255, respectively. To manually actuate the relays 252–255 to effect distribution of articles to the levels I–IV, four electric switches 260–263 may be provided which are connected between the source of electrical supply 239 and the relays.

When material having dispatching information thereon, such as a punched card, for example, is fed into the dispatching unit 233 from the left, as indicated by the arrow in FIG. 10, it is moved past the contact breaker 237 between the driving roller 235 and the pressure roller 236. The contact breaker 238 closes a circuit for the contact breaker 220 at the elevator 201 which, when it is actuated by the articles, completes a circuit for the solenoid 243 associated with the pressure roller 236 by the conductor 241 and the relay 242. The pressure roller 236 is lifted against the punched card which presses the latter against the driving roller 235, whereby the punched card is advanced to the right in FIG. 10. When a hole in the punched card or marking member coincides with the location of one of the contact breakers 244–247, a circuit is completed by the conductors 256, 257, 258 and 259 to the relays 252, 253, 254 and 255.

All of the relays 252–255 are connected with the source of electrical supply 239 by the conductor 264. The relay 252 is connected by conductor 265 with relay 266 and by another conductor 267 with an electric valve 268 for operating, by a remote or master air control valve 269, the pneumatic cylinder 229 (FIG. 9) at level I, the pneumatic cylinder 229 (FIG. 9) being adapted to actuate the stop (not shown) located on the platform 219 of the elevator 201. The relay 266 is connected by a conductor 270 to a solenoid-operated valve 271 to actuate a remote or master air control valve 272 (FIGS. 9 and 10) which is connected to the pneumatic cylinder 216 for the elevator 201. The relay 266 is also connected by a conductor 273 with the relay 242 and by a conductor 274 with the source of electrical supply 239.

The relay 253 is connected by conductors 275 and 265 with the relay 266. The relay 253 is also connected by a conductor 276 with a solenoid-operated valve 277 to operate a remote or master air control valve 278 (FIGS. 9 and 10) which is connected to the pneumatic cylinder 217 for the elevator 201. By a conductor 279 the relay 253 is also connected to a solenoid-operated valve 280 (FIGS. 9 and 10) to operate a remote or master air control valve 281 which is connected to the pneumatic cylinder 230 at level II. The relay 254 is connected by conductors 290 and 265 to the relay 266, and by a conductor 291 to a solenoid-operated valve 292 (FIGS. 9 and 10) to operate a remote or master air control valve 293 which is connected to the pneumatic cylinder 218 for the elevator 201.

The relay 254 is connected by a conductor 294 to a solenoid-operated valve 295 (FIGS. 9 and 10) to operate a remote or master air control valve 296 which is connected to the pneumatic cylinder 231 at level III. The relay 255 is connected by conductors 297 and 265 to the relay 266, and by a conductor 298 to the same solenoid-operated valve 278 to which the relay 253 is connected. The relay 255 is also connected by a conductor 299 to the same solenoid-operated valve 292 to which the relay 294 is connected by conductor 291. The relay 255 is connected by a conductor 300 to solenoid-operated valve 301 (FIGS. 9 and 10) to operate a remote or master air control valve 302 which is connected to the pneumatic cylinder 232 at level IV.

When a hole in the punched card coincides with the contact breaker 247 in the dispatching unit 233, a circuit is completed by the conductor 256 to the relay 252. From the relay 252, a circuit is completed by conductor 265 to the relay 266 and a circuit is completed by the conductor 267 to the solenoid-operated valve 268. From the relay 266 two circuits are completed, one by the conductor 270 to the solenoid-operated valve 271 which actuates the remote or master air control valve 272 to supply air under pressure to the pneumatic cylinder 216 to render it operable to lift the platform 219 to the level I, and one by the conductor 273 to the relay 242 which interrupts the current to the solenoid 243 associated with the pressure roller 236 of the dispatching unit, whereby the pressure roller no longer functions to hold the punched card against the driving roller and the card stops moving.

The solenoid-operated valve 268 actuates the remote or master air control valve 269 to supply air under pressure to the pneumatic cylinder 229 at the level I which functions to actuate the stop (not shown) on the platform 219. By actuating the stop by the cylinder 229 to render it inoperable, the article on the inclined platform 219 is released and can roll by gravity, as shown in FIG. 9, onto the distribution path 202 at level I. A contact breaker 303 in the distribution path is connected by a conductor 304 to the source of electrical supply 239 and by a conductor 305 to a solenoid-operated valve 306 associated with the remote or master air control valve 269 connected to operate the pneumatic cylinder 229 and by a conductor 307 to a relay 308. The relay 308 is connected by a conductor 309 to the source of electrical supply 239 and by three conductors 310, 311 and 312 to the solenoid-operated valves 313, 314 and 315, respectively, associated with the remote or master air control valves 278, 272 and 293, respectively, to operate the pneumatic cylinders 217, 216 and 218, respectively.

After an article fed to the distribution path 202 at level I actuates the contact breaker 303, a circuit is completed for the solenoid-operated valve 306, whereby the remote or master air control valve 269 is rendered operable to return the pneumatic cylinder 229 to an inactive position. At the same time, a circuit is completed for the relay 308 by the conductor 307, the relay 308 in turn completing a circuit by the conductors 310–312 from the conductor 309 to the solenoid-operated valves 313–315. The solenoid-operated valves 313 and 315 actuate the remote or master air control valves 278 and 293 whereby the latter can supply air under pressure to the negative sides of the pneumatic cylinders 217 and 218, and the solenoid-operated valve 314 actuates the remote or master air control valve 272 so that the latter will function to enable air to be evacuated from the pneumatic cylinder 216.

Contact breakers 316–318, which correspond to the contact breaker 303, are provided for levels II–IV and are connected by conductors 319, 320 and 321, respectively, to the source of electrical supply 239 and by conductors 322, 323 and 324, respectively, to solenoid-operated valves 325, 326 and 327, respectively, for the remote or master air control valves 281, 296 and 302, respectively. Also, the contact breakers 316–318 are connected by conductors 328, 329 and 330, respectively, to the relay 308. Due to the fact that each contact breaker 303, 316–318 actuates the pneumatic cylinders 216–218, the elevator 201 is always returned to its starting position.

It should be understood that the dispatching unit 233 in FIG. 10 can also be adapted for continued distribution of articles from the article receiving lines or distribution paths 202 to the respective storage paths, and for this purpose a schematic development of the dispatching unit is shown in dotted lines which includes a contact breaker 331 which can be arranged to function in the same manner as the contact breaker 68 in the embodiment of FIG. 6. In FIG. 6 the contact breaker 68 is connected to the contact breaker 72 which is actuated by the propelling members 21 of the belt 15. While the control arrangement in FIG. 6 is embodied in an installation in which articles are suspended from carrier units, it should be understood that the contact breaker 331 also can be connected to the contact breaker 227 in front of the stop 225 of the distributing path, as shown in FIG. 9, in an installation in which articles are supported at their bottoms. In such case, the dispatching unit may be of the kind shown in FIG. 6 and described above.

Figure 11:
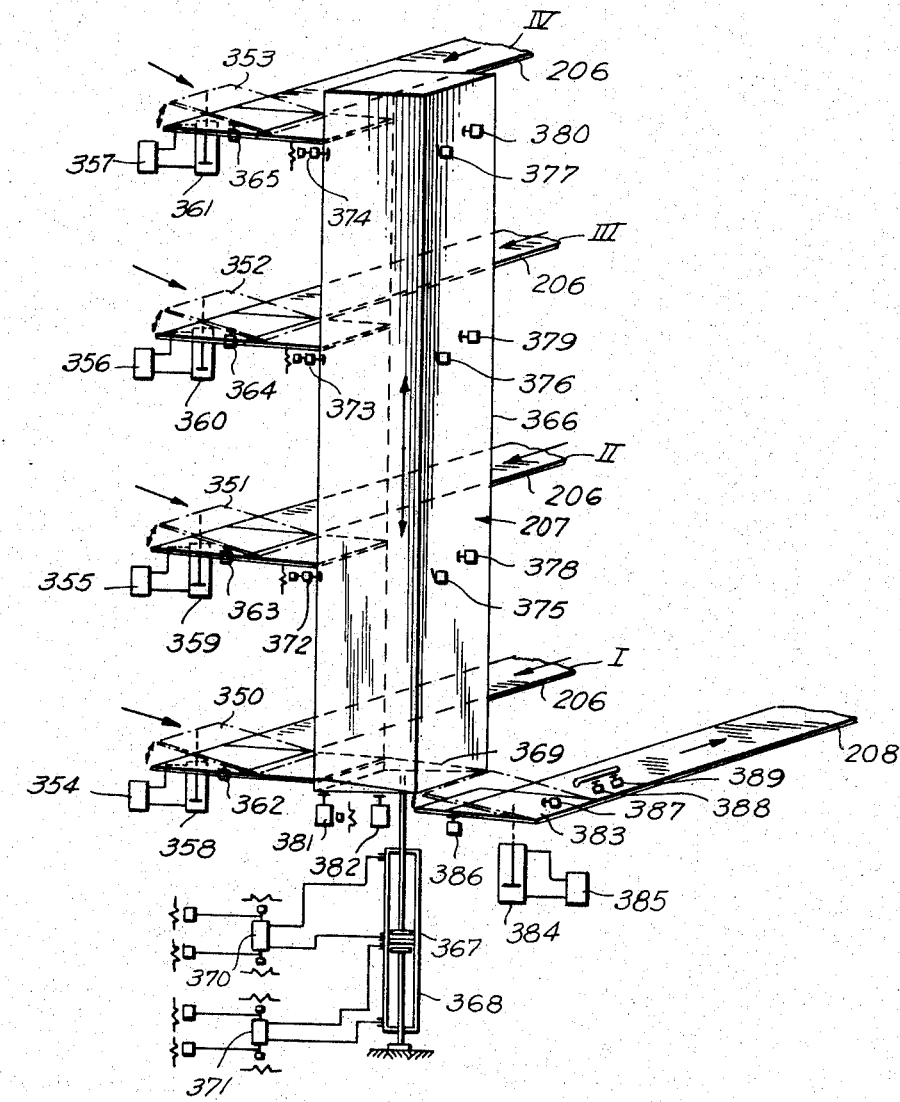
FIG. 11 is a diagrammatic representation of the control provisions for transferring the distributed articles to article delivery paths at the different levels of the conveyor system shown in FIG. 8 and lowering the articles by the same elevator from the different levels.

FIG. 11 schematically illustrates the feed side of the conveyor system shown in FIG. 8. At each level I–IV, an article delivery line or collecting path 206 to which articles are transferred from the storage paths (not shown) extends toward the elevator 207. Each collecting path 206 is provided with a switch unit 350, 351, 352 and 353, respectively, each switch unit being shown in its closed position in solid lines and in its open position in dotted lines. The switch units 350–353 are moved to these positions by pneumatic cylinders 358, 359, 360 and 361, respectively, operated by remote or master air control valves 354, 355, 356 and 357, respectively. At each switch unit is located a pilot air control valve 362, 363, 364 and 365, respectively, actuated by the articles, as will be described hereinafter.

The elevator or lift 207 comprises a platform 369 which is displaceable to the different levels I–IV in an elevator shaft 366 by pneumatic cylinders 367 and 368. To these cylinders are supplied air under pressure by two remote or master air control valves 370 and 371. To lift the platform 369 from the level I to level II air under pressure is supplied only to the cylinder 367, to lift the platform to level III air under pressure is supplied to the cylinder 368, and to lift the platform to level IV air under pressure is supplied both to cylinders 367 and 368. At the different levels valves and contact breakers 372–382 are provided which are actuated by the articles and the platform, respectively. The platform 369 is like the platform 219 for the elevator 201 and is inclined downward to the delivery side so that articles on the platform can move by gravity onto the delivery path 208 in front of the elevator which is provided with a switch unit 383 by which the articles can be lowered to a level with the delivery path 208. The switch unit 383 can be moved downward from an upper position indicated in dotted lines to a lower position indicated in solid lines by a pneumatic cylinder 384 which is operated by a remote or master air control valve 385. Pilot air control valves actuated by the switch unit and the articles, respectively, are indicated at 386 and 387, respectively. In the delivery path 208 are provided two pilot air control valves 388 and 389 which are actuated by articles delivered to the path 208.

Figure 12:
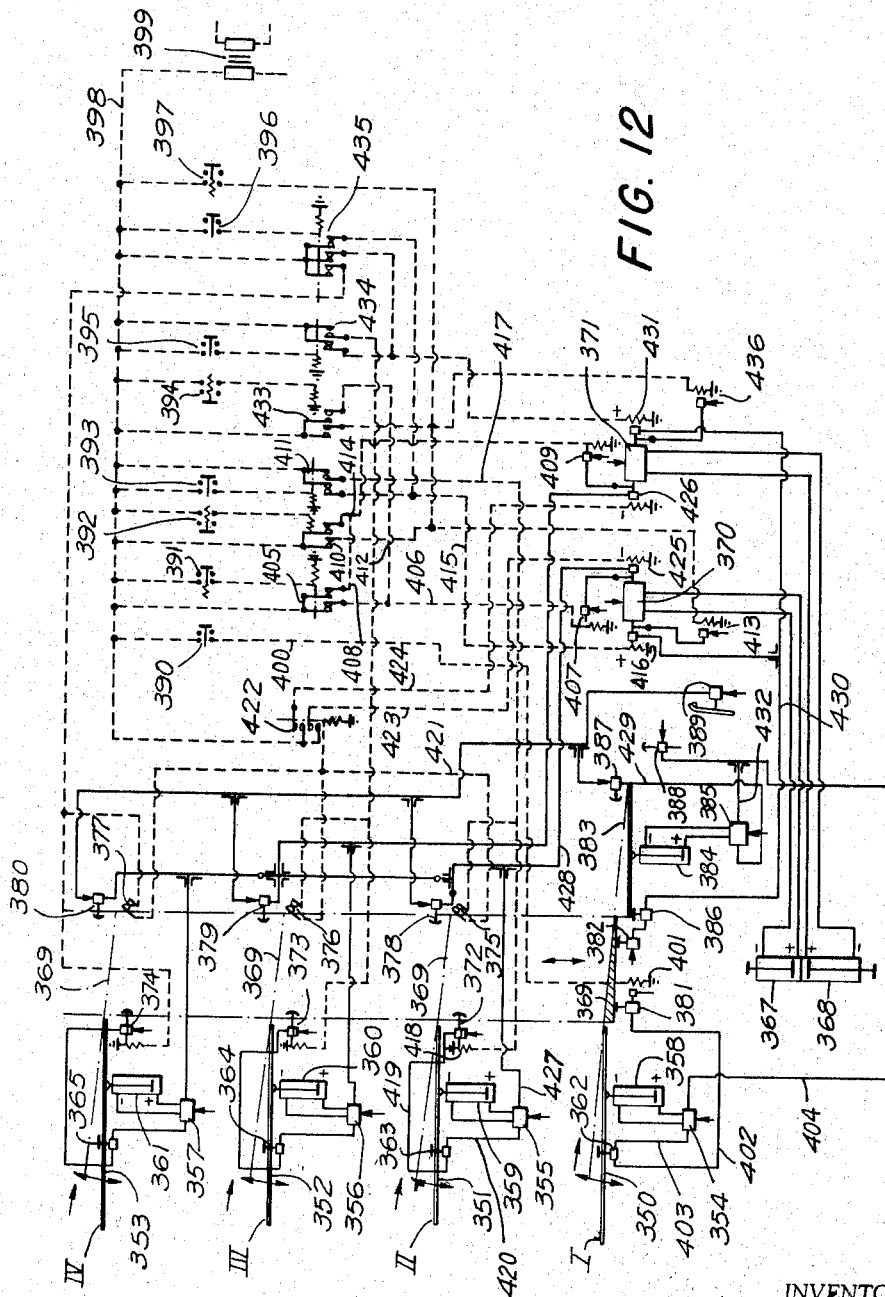
FIG. 12 is a diagrammatic representation of an electrical circuit embodied in the control provisions illustrated in FIG. 11.

FIG. 12 shows a schematic diagram for the delivery side of the conveyor system shown in FIG. 11. The switch units 350–353 located at the different levels I–IV are illustrated in dotted lines in their upper positions to feed articles onto the platform 369, and by solid lines in their lower positions to receive articles from the collecting paths 206. The platform 369 is shown in solid lines at level I, and the position for the platform at the other levels II–IV is indicated by dotted lines. In the connecting diagram, electrical conductors are represented by dotted lines, and conduits for conducting air under pressure are represented by solid lines, a non-return valve in an air conduit being represented by a circle in a solid line. Although the cylinders 367 and 368 are intended to lift the platform 369 to the different levels I to IV, in order to simplify the drawing they are not shown connected to the platform.

To remove articles from each level I–IV, pairs of contact breakers 390 and 391, 392 and 393, 394 and 395, and 396 and 397, respectively, are employed, as shown in FIG. 12. These contact breakers desirably are manually operable, although it should be understood that they can be actuated by a dispatching unit like that shown and described above. All of the contact breakers 390–397 are connected by a conductor 398 with a source of electrical supply 399. In the pairs of contact breakers provided, only one, such as the contact breaker 392, for example, is adapted to be closed momentarily, the other, such as the contact breaker 393, for example, being adapted to be constantly closed. These pairs of contact breakers can be combined into a unit which, when it is actuated, first produces a momentary and thereupon a constant closing of the contact breaker. This is of importance in the removal of more than one article from the same level, as will be brought out hereinafter. When the delivery of articles is controlled by a dispatching unit operated by punched cards, for example, and a card accompanies each article or package, the contact breakers can only be closed momentarily.

The contact breaker 390 is connected by a conductor 400 with a solenoid-operated valve 401 which is adapted to supply air under pressure to control valve 381 actuated by the platform 369. When the platform 369 is at level I, the valve 381 is actuated and a connection is effected by air conduit 402 to the control valve 362 at the switch unit 350 when it is actuated by an article thereon. When the control valve 362 is actuated by an article, a connection is produced by a conduit 403 to the remote or master air control valve 354 to supply air under pressure to the pneumatic cylinder 358. The cylinder 358 becomes effective to lift the switch unit 350, whereby an article thereon moves by gravity onto the platform 369 and subsequently from the platform onto the switch unit 383 of the delivery path 208, as will be described hereinafter.

The second contact breaker 391 to feed articles from level I is connected to a relay 405. The relay 405 is connected by conductor 398 to the source of electrical supply 399 and by a conductor 406 to a solenoid-operated valve 407 associated with remote valve 370 to supply compressed air to the pneumatic cylinder 367 of the platform 369, and by the conductor 408 to a solenoid-operated valve 409 associated with remote valve 371 to supply compressed air to the pneumatic cylinder 368 of the platform 369. Both solenoid-operated valves 407 and 409 are adapted to actuate the remote valves 370 and 371 in such a manner that compressed air is supplied to the pneumatic cylinders 367 and 368 to cause the platform 369 to move downward from any of levels II to IV to level I. The contact breakers 392 and 393 for delivering the articles from level II are respectively connected to relays 410, 411 which are connected by conductor 398 to the source of electrical supply 399. The relay 410 is connected by a conductor 412 to a solenoid operated valve 413 and by conductor 414 to solenoid-operated valve 409. The solenoid-operated valve 413 is adapted to actuate the remote valve 370 and the solenoid-operated valve 409, as explained above, is adapted to actuate the remote valve 371. The relay 411 is connected by a conductor 415 to a solenoid-operated valve 416 to actuate the remote valve 370. The relay 411 is connected by a conductor 417 to a solenoid-operated valve 418 to supply compressed air to the control valve 372, and to the contact breaker 375 which, like the valve 372, can be actuated by the platform 369. The valve 372 is connected by a conduit 419 to the control valve 363 which is actuated by the article on the switch unit 351. The control valve 363 is connected by a conduit 420 to a remote valve 355 which supplies compressed air to the pneumatic cylinder 359 for the switch unit 351. The contact breaker 375 is connected by a conductor 421 to a relay 422 which in turn is connected by conductors 423 and 424 to solenoid-operated valves 425 and 426, respectively, to effect operation of the remote valves 370 and 371.

When articles are fed from the level II, the contact breakers 392 and 393 are actuated. When the contact breaker 392 is actuated, a circuit is completed from the relay 410 by conductor 412 to the solenoid-operated valve 413 and by conductor 414 to solenoid-operated valve 409. When the platform 369 is at level IV and the pneumatic cylinder 368 is actuated by the remote control 371 and the solenoid-operated valve 409 associated therewith, compressed air is fed to the negative side of the cylinder 368 to cause the latter to move downward and lower the platform 369 to level II. When the platform 369 is at level III and the pneumatic cylinder 368 is actuated by the remote valve 371 and the solenoid-operated valve 409 associaed therewith to lower the platform to its bottom position, and at the same time the pneumatic cylinder 367 is actuated by the remote valve 370 and the solenoid-operated valve 413 associated therewith to move the platform upward, the platform 369 will be moved to level II. If the platform 369 should be at level II, the operation just described would not occur and the controls would be ineffective to actuate cylinders 367 and 368. When the platform 369 is at level I and the pneumatic cylinder 367 is actuated by the remote valve 370 and the solenoid-operated valve 413 associated therewith to move the platform upward, the platform will be raised to the level II.

When contact breaker 393 is actuated, a circuit is completed from the relay 411 by the conductor 415 to the solenoid-operated valve 416, and a circuit also is completed therefrom by the conductor 417 to the solenoid-operated valve 418 and the control switch 375 at level II. When the platform 369 is located at level II, it actuates the control valve 372 and the contact breaker 375. When the solenoid-operated valve 418 functions to supply compressed air to the control valve 372 and the platform 369 causes this valve to open, compressed air is supplied by the conduit 419 to the control valve 363. When the control valve 363 is opened by an article on the switch unit 351 and compressed air is supplied by the conduit 420 to the remote valve 355, the latter functions to cause the pneumatic cylinder 359 to lift the switch unit 351.

Articles move by gravity from the switch unit 351 onto the platform 369. When this occurs the control valve 378 is actuated. The control valve 378 is connected by a conduit 427 to the remote valve 355 and by a conduit 428 to the solenoid-operated valve 425. When the control valve 378 is actuated, compressed air is supplied to the remote valve 355 and functions to cause the pneumatic cylinder 359 to lower the switch unit 351. When the contact breaker 375 is actuated by the platform 369, it completes a circuit to the relay 422 by the conductor 421, and the relay 422 in turn completes circuits by the conductors 423 and 424 to the solenoid-operated valves 425 and 426, respectively. When compressed air is supplied to solenoid-operated valve 425, only the remote valve 370 is actuated which functions to supply compressed air to the negative side of the pneumatic cylinder 367 to move it to its bottom position and lower the platform 369 to level I.

At level I the platform 369 actuates control valve 382 which is in communication with the control valve 386 which in turn is actuated by the switch unit 383 associated with the delivery path 208. The articles move by gravity from the platform 369 onto the switch unit 383 which is always in its upper position after articles have moved therefrom. The article on the switch unit 383 actuates the control valve 387 which is connected by a conduit 429 to the remote valve 385 operatively associated with the pneumatic cylinder 384 for operating the switch unit 383. When an article or package actuates the control valve 387, compressed air is supplied to the remote valve 385 which functions to supply compressed air to the pneumatic cylinder 384 to render it operable to lower the switch unit 383. The article is moved downward by the switch unit 383 onto the delivery path 208 on which the article moves from the switch unit 383. In its lower position the switch unit 383 actuates the control valve 386 which is connected by the conduit 430 to the solenoid-operated valve 416 associated with the remote valve 370 and also to another solenoid-operated valve 431 associated with the remote valve 371. Compressed air is supplied to the remote valve 371 when control valve 386 is actuated. But since no circuit is completed for solenoid-operated valve 431 at the time this occurs, the remote valve 371 remains inactive. However, when control valve 386 is actuated a circuit is completed for solenoid-operated valve 416, whereby remote valve 370 is rendered operable to cause the pneumatic cylinder 367 to lift the platform 369 to level II.

In the delivery path 208 a control valve 388 is provided which is actuated by the articles. The control valve 388 is connected by a conduit 432 to the remote valve 385 associated with the pneumatic cylinder 384 for operating the switch unit 383 and by a conduit 404 to the remote valve 354 associated with the pneumatic cylinder 358 for operating the switch unit 350. When the control valve 388 is acted upon by an article, compressed air is supplied from the valve 388 to the remote valve 385 which functions to supply compressed air to the pneumatic cylinder 384 which is rendered operable to raise the switch unit 383 to its upper position. Compressed air also is supplied from the control valve 388 to the remote valve 354 which functions to supply compressed air to the pneumatic cylinder 358 which is rendered operable to lower the switch unit 350. Hence, the control valve 388 in the delivery path 308 functions to return the switch unit 383 in the delivery path to its upper position and to return the switch unit 350 at level I to its lower position.

In addition, a control valve 389 is provided in the delivery path 208. As shown in FIG. 12, the control valve 389 is connected to all of the valves 387, 378, 379 and 380 at the different levels I–IV and functions as a safety or relief valve. If the delivery path 208 is full of articles whereby the valve 389 is actuated continuously, compressed air will not be supplied to the valves 387 and 378 to 380.

It will be understood that the other manually actuated contact breakers 394 to 397 for delivery of articles from levels III and IV are substantially connected in the same manner as the contact breakers described above. In order to effect delivery of articles from levels III and IV three relays 433–435 are provided together with another solenoid-operated valve 436 associated with the remote valve 371. In view of the above description, it is not necessary to describe these additional relays and solenoid-operated valves directed to the delivery of articles from levels III and IV.

While I have shown and described several embodiments of my invention, it will be apparent to those skilled in the art that certain features may be employed independently of others and that modifications and changes may be made without departing from the spirit and scope of the invention. I therefore do not wish to be limited to the embodiments shown in the drawing and described in the specification and aim in the following claims to cover all modifications and changes which fall within the true spirit and scope of the invention.

I claim:

1. In a conveyor system, a feed line along which articles are adapted to be moved, said feed line including means for advancing articles therealong, means for stopping an article at a first zone of the feed line, means to render said stop means ineffective to hold the article at the first zone and enable said article advancing means to advance the article along the feed line, said feed line including a transfer device including a part movable between a first inactive position and a second active position, transfer device mechanism for moving said part between said two positions, a control member for said transfer device mechanism which is at the immediate vicinity of said transfer device and movable from a first inactive position to a second operable position responsive to an article on the feed line at the immediate vicinity of said transfer device, a control unit for the conveyor system operable by means including material having dispatching information, such as a punched card, for example, said control unit providing a path of movement for the material, means for moving the material along the path of movement in synchronism with the article advancing means, means responsive to the material fed to said control unit to render the material moving means inoperable and stop the material when the latter reaches a first position of the path of movement, said stop means being effective to stop the article at the first zone of the feed line when the material is at the first position of the path of movement, said control unit including a first control element along the path of movement which normally is inactive and is rendered active by the material after movement thereof to a second position of the path of movement, the interval of time it takes for the material to move from the first position to the second position of the path of movement and the interval of time it takes for an article to advance from the stop means to said control member to effect movement thereof to its second operable position being substantially the same, means operable when the material is at its first position for actuating said means to render said stop means ineffective to hold the article at the first zone of said feed line and to render said material moving means operable to move the material along the path of movement, and means responsive both to the first control element when rendered active by the material after movement thereof to the second position and movement of the control member to its second operable position by the article moving from the stop means to render the transfer device mechanism operable to move said part from its first inactive position to its second active position to effect transfer of the article from the second zone of the feed line.

2. A conveyor system as set forth in claim 1 in which said control unit includes a second control element at a third position of the path of movement at which the material is fed thereto, said second control element normally being inactive and rendered active responsive to feeding of material to the path of movement at the third position, and means including said second control element when rendered active at the third position to render said material moving means operable to move the material to the first position.

3. A conveyor system as set forth in claim 2 which includes a third control element which normally is inactive and rendered active responsive to movement of a part of the article advancing means of the feed line, and said means to render said material moving means operable to move the material from the third to the first positions including said second and third control elements when both of them are rendered active.

4. A conveyor system as set forth in claim 3 which includes means to render said third control element inactive by the material after movement thereof to the first position.

5. A conveyor system as set forth in claim 4 which includes a fourth control element which normally is inactive and rendered active responsive to movement of said part of said article advancing means of the feed line after said third control element is rendered active responsive to movement of said part, a fifth control element at the vicinity of said first zone of said feed line and movable from an inactive position to an active position responsive to positioning of an article on the feed line at said first zone thereof in front of said stopping means which is effective to hold the article at the first zone, said means operable when the material is at its first position for actuating said means to render said stop means ineffective to hold the article at the first zone and enable said article advancing means to advance the article along the feed line including said fourth and fifth control elements when both of them are rendered active.

6. A conveyor system as set forth in claim 5 in which said material moving means is rendered operable to move the material from said first position in its path of movement responsive to functioning of said means operable to render said stop means ineffective to hold the article at said first zone and enable said article advancing means to advance the article along the feed line, whereby movement of the material from the first position and movement of the article from said first zone are synchronized.

7. A conveyor system as set forth in claim 1 in which said feed line comprises a horizontally disposed track and carrier units movable along said track, said carrier units having carrying means depending downward therefrom, said carrying means functioning to hold articles which are suspended from said carrier units, said means for advancing articles along said track comprising an endless belt having spaced parallel straight runs and members which are fixed thereto and project therefrom in spaced relation lengthwise of the runs of said belt, means for driving said belt to impart movement to said belt members, and said carrier units being in the path of movement of said belt members at one of the runs of said belt.

8. A conveyor system as set forth in claim 7 in which said track includes a section along which said carrier units are movable by said belt members, said track section being angularly movable from and to said track, said angularly movable track section defining said movable part of said transfer device, said movable track section being in its inactive position when it functions as a section of said track and in its active position when angularly moved from said track.

9. A conveyor system as set forth in claim 8 which includes a storage path transverse of said track, said storage path extending horizontally and sloping downward from one end to its opposite lower end, said storage path comprising a track having the one end thereof arranged to receive carrier units from said movable track section in its active position, said track including said movable track section thereof and the track forming said storage path functioning as components of said conveyor system, all of said components in transverse section being of inverted U-shape, the closed ends of the inverted U-shaped components serving as the tops of said components, the outer ends of the parallel legs having inward extending flanges whose inner ends are spaced from one another to provide a gap therebetween, and said carrier units having rollers journaled thereon which are movable on the top surfaces of said flanges and the carrying means of said units depending downward through the gap therebetween.

10. A conveyor system as set forth in claim 9 including means for mounting one end of said track section for pivotal movement on said track, a curved rail having one end fixed to the top of said track adjacent to the outer free end of said track section and the opposite end thereof fixed to the top of said storage path, and a roller rotatably mounted on the top of said track section at the outer free end thereof, said roller being movable on said curved rail.

11. In a conveyor system, a feed line along which articles are adapted to be moved, said feed line including means for advancing articles therealong, means for stopping an article at a first zone of the feed line, first mechanism to render said stop means ineffective to hold the article at the first zone and enable said article advancing means to advance the article along the feed line, said feed line including a plurality of transfer devices to effect transfer of articles from the feed line at a number of transfer zones which are different distances from the first zone, each of said transfer devices including a part which is movable between a first inactive position and a second active position and actuated by a different second mechanism, each second mechanism having its own independent control member which is at the immediate vicinity of a different one of said transfer zones and movable from a first inactive position to a second operable position responsive to an article at the vicinity of the transfer zone associated therewith, a control unit for the conveyor system operable by means including material having dispatching information, such as a punched card, for example, said control unit providing a path of movement for the material, means for moving the material along the path of movement in synchronism with the article advancing means, means responsive to the material fed to said control unit to render the material moving means inoperable and stop the material when the latter reaches a first position of the path of movement, said stop means being effective to stop the article at the first zone of the feed line when the material is at the first position of the path of movement, said control unit including a plurality of first control elements which are distributed lengthwise of and along the path of movement and normally inactive and one of which is rendered active by the material after movement thereof to one of a plurality of second positions along the path of movement, the interval of time it takes for the material to move from the first position to a different one of the second positions of the path of movement and the interval of time it takes for an article to advance from the stop means to a corresponding different one of said control members to move it to its second operable position being substantially the same, means operable when the material is at its first position for actuating said first mechanism to render said stop means ineffective to hold the article at the first zone of said feed line and to render said material moving means operable to move the material along the path of movement, and means responsive to one of the first control elements when rendered active by the material after movement thereof to the one of a plurality of second positions and movement of the corresponding different control member to its second operable position by the article moving from the stop means to render the second mechanism associated with the control member operable to move said part associated therewith from its first inactive position to its second active position to effect transfer of the article from one of the transfer zones of the feed line.

12. A conveyor system including an article collecting line comprising a horizontally disposed track, a second stationary storage path which is transverse to said track and slopes downward, carrier units for holding articles thereon, said carrier units being movable along said track and also movable downward along said storage path, said track having a gap for a switch section which is angularly movable on said track between a first inactive position in which the section closes the gap and forms part of said track and a second active position having its outer free end arranged to receive carrier units from the lower end of said storage path, structure at the lower end of said storage path having a first member functioning to stop the leading carrier unit on said storage path and a second member functioning to hold back the second carrier unit on said storage path, first means movable between first and second positions for controlling said first and second members, said first member being operable to stop the leading carrier unit and the second member being inoperable to hold back the second carrier unit when said first movable means is in its first position and said switch section is in its first inactive position, said first member being inoperable to stop the leading carrier unit and said second member being operable to hold the second carrier unit when said first movable means is in its second position, second means for moving said switch section between its inactive and active positions, third means operable when said second switch section moving means moves said switch section from its inactive position to its active position to move said first means from its first position to its second position, and means operable when said first means has moved to its second position to move said first means from its second position to its first position.

13. A conveyor system as set forth in claim 12 in which said first and second members, respectively, comprise first and second rod-like elements which are at opposite sides of said storage path and transverse thereto, said first element being in the path of movement of the leading carrier unit in the first position of said first means and the second element being in the path of movement of the second carrier unit in the second position of said first means.

14. A conveyor system as set forth in claim 12 in which said track and switch section and storage path function as components of said conveyor system, all of said components in transverse section being of inverted U-shape, the outer ends of the parallel vertical legs of the components having inward extending flanges whose inner ends are spaced from one another to provide a space therebetween, said carrier units having rollers journaled thereon which are movable on the top surfaces of said flanges, said carrier units having carrying means depending downward through the space, means for pivotally connecting one end of a first vertical leg of said switch section and a first vertical leg of said track at a region adjacent to the gap for said angular movement between its active and inactive positions, said pivotal connection being effected on the first vertical legs of said track and switch section which are nearer to the discharge end of said storage path than the other second vertical legs of said track and switch section, and a horizontally disposed plate fixed to the flange of the track at the vicinity of said pivotal connecting means, said plate projecting into the gap beyond the end of the track adjacent to the gap when the switch section is moved to its active position and having an edge which is inclined to the line of travel of said carrier units along said switch section and in the path of movement of the downward depending carrying means of the units, the inclined edge of said plate functioning to cause the carrier unit being transferred on said switch section from said storage path to said track to slide along the inclined edge of said plate and promote transfer of said carrier unit to said track from said switch section when the latter reaches its inactive position.

References Cited

UNITED STATES PATENTS

| | | | |
|---|---|---|---|
| 2,527,244 | 10/1950 | Culver | 104—88 |
| 2,722,322 | 11/1955 | Gunderson | 214—16.14 |
| 2,835,206 | 5/1958 | Gordon et al. | 104—88 |
| 2,909,128 | 10/1959 | Keen | 104—88 |
| 3,056,360 | 10/1962 | Burmeister | 104—88 |
| 3,068,451 | 12/1962 | Bolander et al. | |
| 3,089,432 | 5/1963 | McKee et al. | 104—88 |

ARTHUR L. LA POINT, *Primary Examiner.*

MORRIS TEMIN, *Examiner.*

S. B. GREEN, J. E. BABER, *Assistant Examiners.*